United States Patent [19]
Billingsley et al.

[11] Patent Number: 6,110,558
[45] Date of Patent: Aug. 29, 2000

[54] CLOTHING BEARING RETROREFLECTIVE APPLIQUES

[75] Inventors: Britton G. Billingsley, St. Paul, Minn.; Vera L. Lightle, Hudson, Wis.

[73] Assignee: 3M Innovative Properties Company, St. Paul, Minn.

[21] Appl. No.: 09/058,433

[22] Filed: Apr. 10, 1998

Related U.S. Application Data

[62] Division of application No. 08/608,995, Dec. 18, 1995, Pat. No. 5,738,746, which is a continuation of application No. 08/420,713, Apr. 10, 1995, abandoned, which is a continuation of application No. 08/221,703, Apr. 1, 1994, abandoned.

[51] Int. Cl.[7] ......................................................... B44C 1/26
[52] U.S. Cl. ............................ 428/67; 428/913; 442/148; 359/518; 359/536; 359/538; 359/540; 359/541
[58] Field of Search ...................... 359/518, 536, 359/538, 539, 541, 540; 442/148, 59; 428/402, 406, 67, 913

[56] References Cited

U.S. PATENT DOCUMENTS

| Re. 30,892 | 3/1982 | Bingham et al. | 428/241 |
|---|---|---|---|
| 3,758,192 | 9/1973 | Bingham | 350/105 |
| 3,802,944 | 4/1974 | Tung | 161/3.5 |

(List continued on next page.)

FOREIGN PATENT DOCUMENTS

| 91108249 | 6/1993 | China | D06Q 1/10 |
|---|---|---|---|
| 0 512 668 A3 | 11/1992 | European Pat. Off. | G02B 5/128 |

OTHER PUBLICATIONS

Zeon Chemicals Elastomers Product Guide (1995).
Hypalon Synthetic Rubber product literature (Jun. 1992).
Dow DAF 808 product literature (Mar. 1990).
Dow DAF 803 product literature (Mar. 1990).
Dow Primacor Adhesive Polymers product literature (no date).
Dow Primacor 3460 product literature (no date).
Dupont Nucrel 1214 product literature (Dec. 1989).
Dupont Nucrel 699 product literature (Nov. 1986).
Dupont Nucrel 599 product literature (Sep. 1986).
Estane 58213 product literature (no date).
Dow Primacor 5980 product literature (1984).
Miles Polysar EPM 306 product literature (Sep. 1991).
Bostik HM4117 Polyester Extrusion Polymer product literature (Mar. 1994).
Bostik 4117 Hot Melt Adhesives product literature (Jun. 1994).
Bostik Hot Melt Adhesives product literature (no date).
Elvax product literature (no date).
C. Crisp et al., An Infra–red Spectroscopic Study of Cement Formation Between Metal Oxides and Aqueous Solutions of Poly(acrylic acid), Journal of Materials Science, 11, pp. 36–48 (1976).
M.A. Romero et al., IR Spectroscopy Approach for the Study of Interactions Between an Oxidized Aluminum Surface and a Poly(Propylene–g–Acrylic Acid) Film, Journal of Applied Polymer Science, vol. 47, pp. 543–554 (1993).
A. Stralin et al., Improved Adhesion Strength Between Aluminum and Ethylene Copolymers by Hydration of the Aluminum Surface, Journal of Applied Polymer Science, vol. 49, pp. 511–521 (1993).

*Primary Examiner*—Blaine Copenheaver
*Assistant Examiner*—Ula C. Ruddock
*Attorney, Agent, or Firm*—Karl G. Hanson

[57] ABSTRACT

An article of clothing 10 bearing a retroreflective applique 12 that has a binder layer 14 onto which a retroreflective layer 19 is disposed. The retroreflective layer 19 includes a layer of optical elements 16 and a metal reflective layer 18, and the binder layer 14 includes a thermoplastic copolymer that includes units which contain carboxyl groups. A retroreflective applique, which uses such a binder layer in conjunction with aluminum-coated or silver-coated optical elements, demonstrates very good home laundering durability.

17 Claims, 1 Drawing Sheet

U.S. PATENT DOCUMENTS

| | | | |
|---|---|---|---|
| 3,836,227 | 9/1974 | Holmen et al. | 350/105 |
| 4,104,102 | 8/1978 | Eagon et al. | 156/295 |
| 4,263,345 | 4/1981 | Bingham | 427/163 |
| 4,533,592 | 8/1985 | Bingham | 428/213 |
| 4,763,985 | 8/1988 | Bingham | 350/105 |
| 4,767,659 | 8/1988 | Bailey et al. | 428/203 |
| 4,896,943 | 1/1990 | Tolliver et al. | 350/105 |
| 4,897,136 | 1/1990 | Bailey et al. | 156/145 |
| 4,955,690 | 9/1990 | Bacon, Jr. | 350/105 |
| 4,968,063 | 11/1990 | McConville et al. | 283/72 |
| 4,983,436 | 1/1991 | Bailey et al. | 428/40 |
| 5,060,981 | 10/1991 | Fossum et al. | 283/109 |
| 5,064,272 | 11/1991 | Bailey et al. | 359/541 |
| 5,066,098 | 11/1991 | Kult et al. | 359/540 |
| 5,080,463 | 1/1992 | Faykish et al. | 359/536 |
| 5,128,804 | 7/1992 | Lightle et al. | 359/515 |
| 5,169,707 | 12/1992 | Faykish et al. | 428/195 |
| 5,171,639 | 12/1992 | Mecke et al. | 428/484 |
| 5,200,262 | 4/1993 | Li | 428/266 |
| 5,283,101 | 2/1994 | Li | 428/141 |
| 5,344,705 | 9/1994 | Olsen | 428/323 |
| 5,474,827 | 12/1995 | Crandall et al. | 428/67 |
| 5,503,906 | 4/1996 | Olsen | 428/195 |
| 5,510,178 | 4/1996 | Olsen | 428/323 |
| 5,536,569 | 7/1996 | Lasch et al. | 428/328 |
| 5,691,846 | 11/1997 | Benson, Jr. et al. | 359/530 |

CLOTHING BEARING RETROREFLECTIVE APPLIQUES

This is a division of application Ser. No. 08/608,995 filed Dec. 18, 1995 now U.S. Pat. No. 5,738,746 which is a continuation of application Ser. No. 08/420,713 filed Apr. 10, 1995 (now abandoned), which is a continuation of application Ser. No. 08/221,703 filed Apr. 1, 1994 (now abandoned).

TECHNICAL FIELD

The present invention pertains to an article of clothing that displays a retroreflective applique and to a method of making the same.

BACKGROUND OF THE INVENTION

Retroreflective appliques have the ability to return a substantial portion of incident light in the direction from which the light originated. This unique ability has led to widespread use of retroreflective appliques on clothing. Persons who work or exercise near motor vehicle traffic need to be conspicuously visible so that they do not get struck by passing motor vehicles. Retroreflective appliques serve the purpose of highlighting a person's presence by retroreflecting light from motor vehicle headlamps.

A retroreflective applique typically comprises a layer of optical elements, a polymeric binder layer, and a specular reflective layer. The optical elements usually are transparent microspheres that are partially embedded in the polymeric binder layer such that a substantial portion of each microsphere protrudes from the polymeric binder layer. The specular reflective layer typically comprises aluminum, silver, or a dielectric mirror, and this reflective layer is disposed on the portion of the transparent microsphere which is embedded in the polymeric binder layer. Light striking the front surface of the retroreflective applique passes through the transparent microspheres, is reflected by the specular reflective layer, and is collimated by the transparent microspheres to travel back in the direction of the light source.

Retroreflective appliques must be able to withstand laundering conditions when displayed on clothing. If the retroreflective applique is not durable to laundering and its retroreflectivity becomes substantially diminished after repeated washings, the clothing cannot continue to serve its safety function by highlighting the wearer's presence. Investigators in the retroreflective applique art have pursued an ongoing goal of developing launderably-durable retroreflective appliques so that persons wearing retroreflective clothing can continue to be conspicuously visible after the clothing has been worn and cleaned many times.

In U.S. Pat. No. 4,763,985 to Bingham, a launderable retroreflective applique is disclosed that comprises a layer of transparent microspheres, a specular reflective layer optically connected to each microsphere, and a binder layer into which the microspheres are partially embedded. Resins disclosed as being suitable for use as binder layers include polyurethane, polyesters, polyvinyl acetate, polyvinyl chloride, acrylics, or combinations thereof. The specular reflective layers are composed of two succeeding layers of dielectric material. The layers have varying refractive indices and are composed of a variety of binary metal compounds including oxides, sulfides, and fluorides. Although the retroreflective applique of U.S. Pat. No. 4,763,985 is disclosed to be durable under laundering conditions, the durability is only provided for appliques that employ dielectric reflectors. The patent does not disclose how to provide a launderable retroreflective sheeting that employs an elemental aluminum or an elemental silver metal reflector.

In U.S. Pat. No. 5,200,262 to Li, a launderable retroreflective applique is disclosed that can employ a reflector that comprises elemental aluminum or elemental silver on the backside of the microspheres. The applique comprises a monolayer of metal-coated microspheres partially embedded in and partially protruding from a binder layer that comprises a flexible polymer having hydrogen functionalities and one or more isocyanate-functional silane coupling agents. The disclosed flexible polymers that possess hydrogen functionalities are crosslinked, flexible urethane-based polymers such as isocyanate-cured polymers or one or two component polyurethanes and polyols. This retroreflective applique can provide excellent laundering durability: it can withstand industrial laundering conditions, which involve wash temperatures as high as 40 to 90° C. (105 to 190° F.) and pH values of 10 to 12.5. Although the applique demonstrates superior laundering durability, it does not do so without a price. The materials employed in the binder layer are relatively expensive, and they typically are solution-coated onto the microspheres, which requires use of a solvent that adds to the processing costs and that must be reclaimed or disposed of in an environmentally sound manner.

In U.S. Pat. No. 5,283,101 to Li, a launderable retroreflective applique is disclosed which comprises a binder layer formed from an electron-beam curable polymer and typically one or more crosslinkers and silane coupling agents. Electron-beam curable polymers disclosed in Li include chlorosulfonated polyethylenes, ethylene copolymers comprising at least about 70 weight percent of polyethylene such as ethylene/vinyl acetate, ethylene/acrylate, and ethylene/acrylic acid, and poly(ethylene-co-propylene-co-diene) polymers. Glass microspheres are embedded in the cured binder layer, and a specular reflective metal layer is disposed on the embedded portions thereof. The retroreflective appliques have been shown to be durable under industrial laundering conditions; however, the applique's binder layer typically includes a crosslinker and a coupling agent and requires the step of curing the polymer with an electron beam. Additionally, a solvent is employed to coat the binder layer onto the microspheres, which needs to be reclaimed or disposed of in an environmentally sound manner.

SUMMARY OF THE INVENTION

The present invention provides a new article of clothing that displays a retroreflective applique having good laundering durability. The retroreflective applique can withstand repeated home washings, and it can do so without employing a dielectric reflector or a relatively expensive binder layer. Further, the applique can be made by processes that do not employ solvents. In brief summary, the article of clothing of the invention comprises:

(a) a retroreflective applique that includes:
   (i) a binder layer that comprises a thermoplastic copolymer that comprises units which contain carboxyl groups;
   (ii) a layer of optical elements having portions embedded in the binder layer; and
   (iii) a metal reflective layer that is disposed beneath the embedded portions of the optical elements; and
(b) a substrate which forms part of the outer portion of the article of clothing, the retroreflective applique being secured to the substrate.

The present invention differs from prior art launderable retroreflective appliques by using a binder layer comprising a thermoplastic copolymer that contains units which possess carboxyl groups. As the term is used herein, "carboxyl group" means a group composed of a carbonyl group and a hydroxyl group bonded to the carbon atom of the carbonyl group, namely, the group -COOH. The applique's binder layer is in a thermoplastic state when secured to the outer surface of the article of clothing. The term "thermoplastic" is used throughout to mean the copolymer is in a morphology that permits it to be heated reversibly and repeatedly to a liquid state without substantially altering the copolymer's melting point. Previous retroreflective appliques have employed crosslinked, non-thermoplastic polymers, crosslinkers, and silane or isocyanate-functional coupling agents in the binder layers. Known retroreflective appliques also have used a solvent to apply the binder layer onto the microspheres. Although known non-thermoplastic binder layers have provided excellent laundering durability to retroreflective appliques, the binder layers also have contributed significantly to the resulting product's cost. The present invention is advantageous over known retroreflective appliques in that acceptable home laundering durability can be provided by use of a relatively inexpensive binder layer, which can be cast onto the applique without the use of crosslinkers, coupling agents, and potentially harmful solvents. Although the laundering durability provided by the invention may not be so great as to resist the more stringent industrial laundering conditions, the articles of clothing of the invention do demonstrate good durability under home laundering conditions, which are the more common type of wash for everyday wearing apparel. Typically, only clothing that is subjected to the most extreme environments, such as a fireman's jacket, is washed under the more stringent industrial conditions, and thus the present invention is capable of satisfying the demand for the more commonly used retroreflective clothing that is washed in the home.

The above and other advantages of the invention are more fully shown and described in the drawing and detailed description of this invention, where like reference numerals are used to represent similar parts. It is to be understood, however, that the drawing and description are for the purposes of illustration only and should not be read in a manner that would unduly limit the scope of this invention.

DETAILED DESCRIPTION OF THE PREFERRED EMBODIMENTS

In describing preferred embodiments of the invention, specific terminology is used for the sake of clarity. The invention, however, is not intended to be limited to the specific terms so selected, and it is to be understood that each term so selected includes all technical equivalents that operate similarly.

Figure 1:
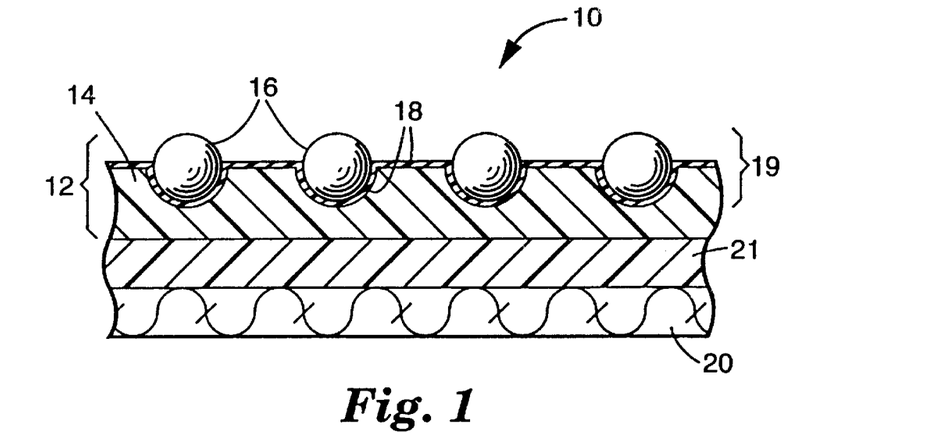
FIG. 1 is a cross-section of a portion of an article of clothing 10 in accordance with the present invention having a retroreflective applique 12 secured thereto.

In the practice of the present invention, an article of clothing is provided that has a retroreflective applique applied thereto which demonstrates good durability under home laundering conditions. FIG. 1 illustrates a portion of an article of clothing 10 of the invention having a retroreflective applique 12 secured thereto. Retroreflective applique 12 includes a binder layer 14, optical elements that may be a monolayer of microspheres 16, and a metal reflective layer 18. Together the microspheres 16 and the metal reflective layer 18 form a retroreflective portion 19 capable of returning a substantial quantity of incident light towards its source. Retroreflective applique 12 may be applied to a substrate 20 that forms part of the article of clothing 10. An adhesive 21 may be used to secure the applique 12 to the substrate 20. Binder layer 14 includes a thermoplastic copolymer that comprises units which contain carboxyl groups. The microspheres 16 are partially embedded in and are partially protruding from the binder layer 14. The metal reflective layer 18 is disposed on the embedded portion of the microspheres 16.

The binder layer typically is a continuous, fluid-impermeable, polymeric, sheet-like layer which has a thickness of about 1 to 250 microns. Preferably, the thickness is about 25 to 75 microns. Thicknesses less than 25 microns may be too thin to adhere to both the substrate and the optical elements, and thicknesses greater than 75 microns may unnecessarily stiffen the applique and add to its cost.

Thermoplastic copolymers that may be used in the binder layer of this invention include units that contain carboxyl groups, including ethylenically unsaturated carboxylic acid containing monomers, such as units of acrylic acid, methacrylic acid, itaconic acid, citraconic acid, maleic acid, fumaric S acid, and combinations thereof. Thermoplastic copolymers that contain units of acrylic acid and/or methacrylic acid are preferred. The acidic monomers may be copolymerized with, for example, one or more of the following ethylenically unsaturated monomers: ethylene; propylene; butadiene; isoprene; isobutylene; acrylonitrile; chloroprene; vinyl halides such as vinyl chloride; vinylidiene halides; vinyl acrylate; vinyl acetate; vinyl alkyl acrylates, where the alkyl group contains 8 or less carbon atoms, such as vinyl methyl acrylate, vinyl ethyl acrylate, and vinyl butyl acrylate; vinyl alkyl methacrylates, where the alkyl group contains 8 or less carbon atoms, such as vinyl methyl methacrylate, vinyl ethyl methacrylate, and vinyl butyl methacrylate; vinyl styrene; vinyl alcohol; alkyl cyanoacrylate, where the alkyl group contains 8 or less carbon atoms; and acrylamide. Preferred thermoplastic copolymers include poly(ethylene-co-acrylic acid) (EAA) and poly(ethylene-co-methacrylic acid) (EMAA). Preferably, the units containing carboxyl groups comprise approximately 2 to 30 weight percent of the copolymer. More preferably, the units containing carboxyl groups comprise approximately 4 to 20 weight percent of the copolymer. The remaining comonomeric(s) units therefore preferably comprise 70 to 98 weight percent of the copolymer, and more preferably 80 to 96 weight percent. Thus, the preferred ethylene copolymers comprise approximately 70 to 98 weight percent ethylene units and 2 to 30 weight percent of units that contain acrylic acid or methacrylic acid, and more preferably comprise 80 to 96 weight percent of ethylene units and 4 to 20 weight percent of units containing acrylic acid or methacrylic acid. Combinations of the various copolymers that contain carboxyl functionality also may be employed. The carboxylic acid groups also can be incorporated into thermoplastic polyurethane, polyester, and polyamide polymers. Examples of commercially available copolymers that may be particularly suitable as binder layers in this invention include: Primacor™ 3460 and 5980, and Dow Adhesive Films (DAF) 803 and 808, all available from Dow Chemical of Midland, Mich.; and Nucrel™ 599 and 699 and Surlyn™ 1702, available from E. I. Dupont de Nemours of Wilmington, Del.

The binder layer also may contain one or more additives such as colorants (for example, pigments, dyes, metal flakes), fillers, stabilizers (for example, thermal stabilizers and antioxidants such as hindered phenols and light stabilizers such as hindered amines or ultraviolet stabilizers), flame retardants, flow modifiers (for example, surfactants such as fluoropolymer silicones), plasticizers, and elastomers. Care should be taken when selecting such additives because some can detrimentally effect laundering durability. It has been found that use of a substantial amount of some pigments, for example, titanium dioxide, can adversely effect post-wash retroreflectivity. Other additives, however, may improve laundering durability. For example, it has been found that plasticizers, such as di-octylterephthalate (DOTP), di-isodecylphthalate (DIDP), and alkylbenzyl phthalate, can improve laundering durability. It also has been found that elastomers can be used in the binder layer, and good results can be achieved. Such elastomers may include Hypalon™ 20 S (available from E. I. Dupont de Nemours and Company, Wilmington, Del.), Polysar™ EPM 306 P (available from Miles, Inc., Polysar Rubber Division, Akron, Ohio), and Nipol™ VT 4555 (available from Zeon Chemicals, Rolling Meadows, Ill.). Preferably, the additives are resistant to degradation or leaching out of the binder layer during laundering.

A colorant may be employed to camouflage discoloration of the binder material and/or impart desired ambient color appearance to the applique. Typically, a black colorant is preferred because it provides the most effective camouflage of the binder material. An applique comprising microspheres with aluminum reflectors as retroreflective elements and black colorant will typically exhibit a pleasing silver appearance. Preferred colorants are black dyes, for example, metal-azo dyes such as chromium-azo dyes. The binder layer typically contains about 0.01 to about 2.0 weight percent, preferably about 0.1 to about 0.5 weight percent of dye.

Supported by the binder layer are optical elements capable of collimating light so that, in conjunction with specular reflective layer, incoming light can be retroreflected. As indicated above, the optical elements used in appliques of this invention can be microspheres which, preferably, are substantially spherical in shape in order to provide the most uniform and efficient retroreflection. The microspheres preferably also are substantially transparent so as to minimize absorption of light so that a large percentage of the incident light is retroreflected. The microspheres often are substantially colorless but may be tinted or colored in some other fashion. The microspheres may be made from glass, a non-vitreous ceramic composition, or a synthetic resin. In general, glass microspheres are preferred because they tend to be less expensive, harder, and more durable than microspheres made from synthetic resins. Examples of microspheres that may be useful in this invention are disclosed in the following U.S. Pat. Nos: 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414. The disclosures of these patents are incorporated here by reference.

Microspheres used in the present invention typically have an average diameter in the range of about 30 to 200 microns. Microspheres smaller than this range tend to provide lower levels of retroreflection, and microspheres larger than this range may impart an undesirably rough texture to the applique or may undesirably reduce its flexibility. Microspheres used in the present invention typically have a refractive index of about 1.7 to about 2.0, the range typically considered to be useful in microsphere-based retroreflective products where the front surfaces of the microspheres are exposed to the ambient environment, namely, air. Retroreflective articles that have the microspheres exposed to the ambient environment commonly are referred to as "exposed lens retroreflective sheetings."

As mentioned above, optical elements used in this invention can have a metal reflective layer disposed beneath the embedded portions of the optical elements. Preferably, the metal reflective layer is disposed on the embedded or rear portions of the optical elements. The term "metal reflective layer" is used herein to mean a layer comprising elemental metal which is capable of reflecting light, preferably specularly reflecting light. A variety of metals may be used to provide a specular reflective metal layer. These include aluminum, silver, chromium, nickel, magnesium, and the like, in elemental form. Aluminum and silver are the preferred metals for use in the reflective layer. The metal may be a continuous coating such as is produced by vacuum-deposition, vapor coating, chemical-deposition, or electroless plating. It is to be understood that in the case of aluminum, some of the metal may be in the form of the metal oxide and/or hydroxide. Aluminum and silver metals are preferred because they tend to provide the highest retroreflective brightness. The metal layer should be thick enough to reflect incoming light. Typically, the metal reflective layer is about 50 to 150 nanometers thick. Although the reflective color of a silver coating can be brighter than an aluminum coating, an aluminum layer normally is more preferred because it can provide better laundering durability when adhered to a glass optical element.

Figure 2:
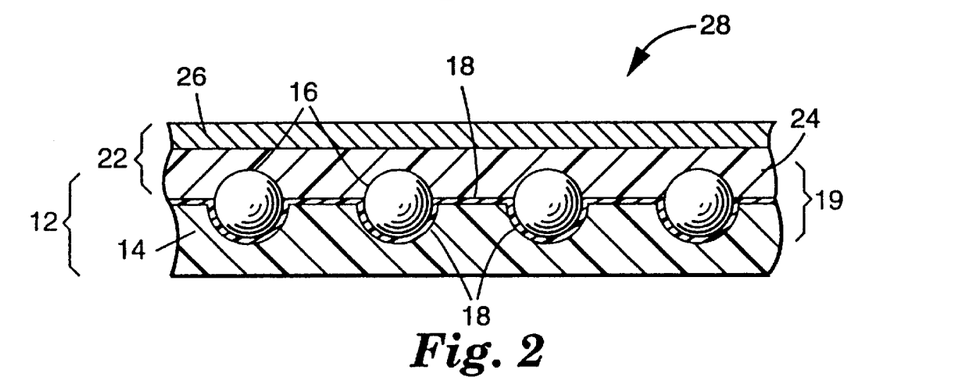
FIG. 2 illustrates an article 28 used to form a retroreflective applique 12.

A retroreflective applique 12 can be made by first forming article 28 shown in FIG. 2. In forming article 28, a monolayer of optical elements is first made by, for example, cascading transparent microspheres 16 onto a carrier web 22. Carrier web 22 secures microspheres 16 thereon in a desired temporary arrangement. Microspheres 16 preferably are packed as closely as possible on the carrier 22, and may be so arranged by any convenient process, such as printing, screening, cascading, or with a hot can roll. Carrier web 22 can include a heat softenable polymer layer 24 on paper sheet 26. Examples of useful polymer layers 24 for carrier web 22 include: polyvinyl chloride; polyolefins such as polyethylene, polypropylene, and polybutylene; and polyesters; et cetera. For a further discussion of applying microspheres to the carrier web, see U.S. Pat. Nos. 4,763,985; 5,128,804; and 5,200,262, the disclosures of which are incorporated here by reference.

Upon cooling, polymer layer 24 retains microspheres 16 in the desired arrangement. Depending in part on the characteristics of the carrier web 22 and microspheres 16, it may be desired to condition carrier 22 and/or microspheres 16 by applying selected release agents or adhesion promoters to achieve desired carrier release properties.

The metal reflective layer 18 is then applied to carrier web 22 on the side where the exposed portions of the microspheres protrude to form retroreflective portion 19. The size of microspheres 16, as indicated by the surface portion of the microspheres covered with the metal reflective layer 18, may be controlled in part by controlling the depth to which the microspheres 16 are embedded in the carrier prior to application of the metal reflective layer 18.

Following formation of retroreflective portion 19, the binder layer 14 can be formed on the specularly reflective layer to form article 28 illustrated in FIG. 2. In the practice of the present invention, the binder layer 14 can be placed over the metal-coated, protruding portions of the microspheres 16 without use of a solvent. This avoids problems of solvent processing, solvent recovery and disposal, and it facilitates field application of the retroreflective applique. A sheet of thermoplastic copolymer that contains carboxyl groups can be applied to the microspheres embedded in the carrier web by laying the thermoplastic sheet over the exposed portions of the microspheres and heating the sheet until it softens and becomes bound to the specular reflective material 18 and hence the microspheres 16. After forming article 28, carrier web 22 then can be removed from the structure, leaving the microspheres 16 embedded in the binder layer 14 as shown in FIG. 1.

Using the technique described above, the thermoplastic binder layer 14 can be applied in a variety of shapes, resembling indicia or characters. This allows the microspheres 16 and the specular reflective metal 18 to be selectively removed from the carrier web 22 so that the applique 12 can retroreflectively display the desired shape, indicia, or characters. In an alternative way of forming a retroreflective applique according to the invention, a sheet of a thermoplastic copolymer that contains carboxyl groups can be first adhered to a substrate (for example, a fabric) that subsequently becomes part of an article of clothing of the invention, and then the carrier web 22 supporting the microspheres 16 and metal reflective layer 18 can be applied thereto, heated, and subsequently removed.

Appliques of the invention may be applied to a substrate using a variety of methods. In one method, the applique's binder layer 14 is heat laminated directly to the underlying substrate. Alternatively, the applique 12 may be mechanically secured to the substrate by, for example, sewing. In some applications, however, it is desired to secure the applique to the substrate by use of an adhesive layer, noted in FIG. 1 by numeral 21. The adhesive layer may be a pressure-sensitive adhesive, a heat-activated adhesive, or an ultraviolet-radiation-activated adhesive. For instance, an iron-on applique may be provided by using a layer of suitably melting thermoplastic material. Although many adhesive resins may not adhere well to an EAA or EMAA layer, it has been found that an EAA layer primed with a NeoRez™ urethane (available from ICI Resins of Wilmington, Mass.) can demonstrate good adhesion to a polyester/urethane hot melt adhesive film such as Estane™ 58213 (available from B. P. Goodrich of Cleveland, Ohio). An adhesive layer sometimes may not be needed because the binder layer can act as its own adhesive.

The substrate to which the retroreflective applique may be applied can be any substrate which subsequently becomes located on the outer surface of the article of clothing, so that the applique is displayed when the clothing is worn in its normal orientation on the person. The substrate may be, for example: a woven or nonwoven fabric such as a cotton fabric; a polymeric layer including nylons, olefins, polyesters, cellulosics, urethanes, vinyls, acrylics, rubbers; leather; and the like.

Figure 3:
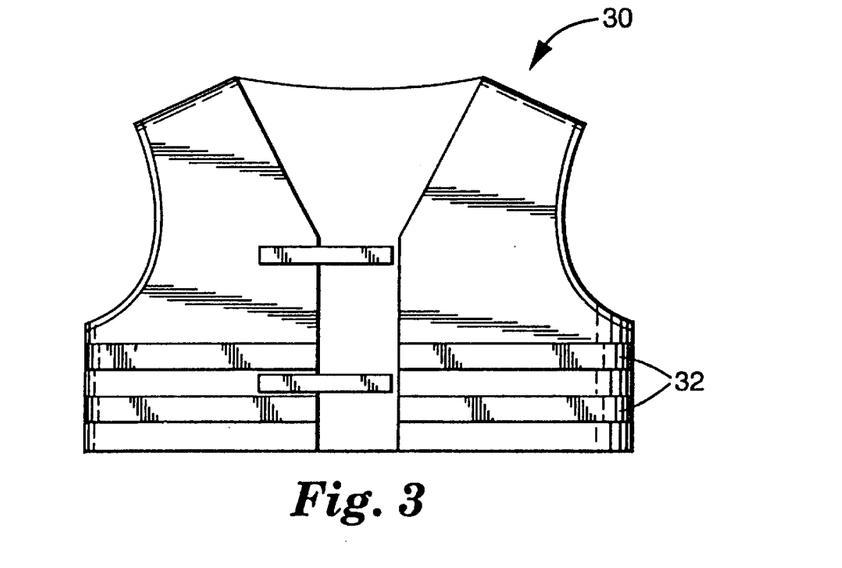
FIG. 3 illustrates an article of clothing 30 in accordance with the present invention which displays a retroreflective applique 32.

FIG. 3 illustrates an example of an article of clothing, a safety vest 30, displaying a retroreflective applique 32. Although a safety vest 30 has been chosen for illustration, the article of clothing of the invention may come in a variety of forms. As the term is used herein, "article of clothing" means a launderable item of wearing apparel sized and configured to be worn or carried by a person. Other examples of articles of clothing that may display retroreflective appliques according to the invention include shirts, sweaters, jackets, coats, pants, shoes, socks, gloves, belts, hats, suits, one-piece body garments, bags, backpacks, et cetera.

Advantages and properties of this invention are further illustrated in the following Examples. It is to be expressly understood, however, that while the examples serve this purpose, the particular ingredients and amounts used as well as other conditions and details are not to be construed in a manner that would unduly limit the scope of this invention.

EXAMPLES

Unless otherwise indicated, all material compositions are expressed in parts by weight.

Example 1

This Example illustrates how to embed a layer of retroreflective elements in a binder layer of the invention, where the binder layer is first applied to a fabric substrate. A base sheet comprising a monolayer of transparent glass microspheres was prepared by providing a carrier web consisting of a paper substrate and a 50 micron thick layer of polyethylene. The carrier web was positioned in a generally horizontal orientation with the polyethylene layer positioned on top. A monolayer of transparent glass microspheres (60–100 micron diameter) was cascaded onto the polyethylene surface layer. The polyethylene was then heated to a temperature in the range 107–148° C. (225–300° F.) to allow the microspheres to settle into the surface to a desired depth, and then allowed to cool. An 80 nanometer thick layer of aluminum was vapor-coated onto the exposed surfaces of the glass microspheres. A thin (50–75 microns thick) sheet of Primacor 3460 (EAA) resin then was extruded onto the surface of a 65/35 polyester/cotton (65% polyester, 35% cotton) fabric (Springs Mills "Excelerate" brand), bonding the resin to the fabric as it cooled. The resin surface of the resin-fabric composite was then laminated to the aluminum vapor-coated side of the base sheet using a lamination temperature of 150° C. After the laminated multi-layer composite was allowed to cool, the paper/polyethylene carrier web was stripped away, exposing the glass surfaces of the microspheres opposite the aluminum coated surfaces now embedded and bonded to the Primacor™ resin.

Examples 2–6

These Examples illustrate how to cast a thermoplastic binder layer of the invention as a separate film and then simultaneously heat laminate a fabric and a microsphere-supported carrier to opposite surfaces of the binder layer.

Examples 2–6 were prepared by extruding films of thermoplastic resins (Table 1) having an acid functionality onto a polyester supporting film, allowing the adjoined films to cool, die-cutting segments of the adjoined films to approximate dimensions of 4 inches by 6 inches (10.2 by 15.2 centimeters (cm)), peeling the segments of thermoplastic resin film off the polyester supporting film, and placing said segments of thermoplastic resin film between a larger segment of 65/35 polyester/cotton fabric and a base sheet comprising a monolayer of microspheres embedded in a paper-supported 50 micron thick layer of polyethylene. An 80 nanometer thick layer of vapor-coated aluminum was disposed on the protruding portions of the microspheres, and the thermoplastic resin was placed in contact therewith. The fabric and base sheet were laminated to opposite sides of said thermoplastic resin film in an HIX™ Model HA-8 laminator at a temperature of about 140° C. for approximately 20 seconds. After the laminated composite structure was allowed to cool, the paper-supported carrier web was peeled away from the remaining layers of the composite, exposing the glass surfaces of the retroreflective elements. The fabric layer was then trimmed to provide a border of approximately 2–5 cm, and the sample applique was sewn onto a 91 cm by 91 cm (36 inch by 36 inch) sheet consisting of a bleached muslin fabric with about a 65/35 polyester/cotton fiber content. Five to ten different samples, each containing a different resin in the binder layer were sewn to the same larger sheet to assure the same time interval of exposure and other conditions of testing. Each sample (Examples 2–6), while attached to the larger fabric carrier, was positioned in the retroluminometer to measure its initial retroreflective brightness, in candelas per lux per square meter (CPL), according to the standard method described in U.S. Defensive Publication T987,003 at divergence angles of about 0.2° and entrance angles of −4°. The initial retroreflective brightness values in CPL for Examples 2–6 are listed in Table I.

The fabrics having the samples attached thereto were then subjected to a series of home laundering tests wherein each sample was subjected to a total of 25 wash cycles and a total of 5 drying cycles. The following test methods were used: each sample was washed for 5 consecutive cycles in a Maytag Model A208 automatic washing machine using the following settings: "Regular" action (setting 10), "Large"Load, "Regular" fabric, and "Hot/Cold" Temperature. The washing machine was attached to a temperature-controlled water supply providing an initial water temperature of 43° C. (110° F.). Forty (40) grams of a standard detergent, obtained from the American Association of Textile Chemists and Colorists (AATCC) Technical Center, P.O. Box 12215, Research Triangle, N.C. 27709 were used for each wash cycle. Each wash cycle was followed by a cold water rinse cycle. After every fifth wash/rinse cycle, each sample was tumble-dried in a Maytag Model DE308 dryer, using machine settings of "Low" Temperature and "Regular" Fabric until the total load was dry. Each sample then was tumbled for a 5–10 minute cooling period in the dryer with the heat turned off. After each drying cycle, each sample was again positioned in the retroluminometer to measure its remaining retroreflective brightness. The complete sequential procedure of 5 wash cycles followed by a drying cycle was repeated 5 times, and then the values for remaining retroreflective brightness in CPL, listed in Table I, were measured by the same procedures and equipment used to obtain the initial values.

TABLE I

| Example | Thermoplastic Resin | Initial CPL | Remaining CPL |
| --- | --- | --- | --- |
| 2 | Primacor ™ 1430 EAA | 572 | 511 |
| 3 | Primacor ™ 3440 EAA | 583 | 559 |
| 4 | Primacor ™ 3460 EAA | 580 | 558 |
| 5 | Primacor ™ 3460 EAA | 566 | 466 |
| 6 | Primacor ™ 3460 EAA | 565 | 443 |

The data in Table I demonstrate that retroreflective appliques of the invention retain high retroreflective brightness after repeated launderings.

Examples 7–14

Examples 7–14 were designed to compare differences in degradation during 25 cycle home laundering tests for various binder layer resins listed in Table II. Examples 7–14 were prepared as described in Examples 2–6 and were subjected to a series of 25 washing cycles and 5 drying cycles in a similar fashion. The initial values of retroreflective brightness, and the values of retroreflective brightness remaining after the 25 washing cycles and 5 drying cycles were also measured in the same way using the same measurement equipment, with the percentage of the original value of retroreflected brightness (% R.B.) remaining after the 25 home wash and dry cycles reported in Table II.

TABLE II

| Example | Resin | Weight Percent Acidic Units | % R.B. |
| --- | --- | --- | --- |
| 7 | Primacor ™ 1430 EAA | 9 | 93% |
| 8 | Primacor ™ 3440 EAA | 9 | 89% |
| 9 | Primacor ™ 3460 EAA | 9 | 98% |
| 10 | Primacor ™ 5980 EAA | 20 | 87% |
| 11 | DAF 803 EAA Film[a] | | 92% |
| 12 | DAF 808 EAA Film[a] | | 95% |
| 13 | Nucrel ™ 599 EMAA | 10 | 84% |
| 14 | Nucrel ™ 699 EMAA | 11 | 78% |

[a]Weight Percent Acidic Units are not known.

The data in Table II demonstrate that retroreflective appliques of this invention retain a very large percent of retroreflective brightness after repeated launderings.

Examples 15–23

Examples 15–23 were designed to evaluate the effects of additives on the performance of a retroreflective applique. Examples 15 and 18 comprise the substantially pure EAA or EMAA resins, and Examples 16–17 and 19–23 are based on the same base resins, respectively, but contain various modifying materials. Examples 15–23 were prepared using the steps and procedures of Examples 2–6 and were also subjected to a series of 25 washing cycles and 5 drying cycles. The initial values of retroreflective brightness, and the values of retroreflective brightness remaining after the 25 washing cycles and 5 drying cycles, were measured using the same measurement equipment. Table III sets forth the composition of the binder layer for each of samples 15–23 and their percentage of retroreflective brightness (% R.B.) remaining of the original value after the 25 home wash and dry cycles. Table III also lists the percentage of retained retroreflective brightness (Rel %), relative to the control examples 15 and 18.

TABLE III

| Example | Resin, Modifier | % R.B. | Rel % |
| --- | --- | --- | --- |
| 15* | 100% Nucrel ® 1214 | 75 | 100 |
| 16 | 80% Nucrel ® 1214, 20% Elvax ® 450 EVA | 65 | 87 |
| 17 | 80% Nucrel ® 1214, 20% Elvax ® 40w EVA | 56 | 75 |
| 18* | 100% Primacor ® 3460 | 82 | 100 |
| 19 | 95% Primacor ® 3460, 5% Di-Iso Decylphtbalate | 91 | 111 |
| 20 | 80% Primacor ® 3460, 20% Estane ® 58271 | 89 | 109 |
| 21 | 80% Primacor ® 3460, 20% 1072 NBR Rubber | 87 | 106 |
| 22 | 80% Primacor ® 3460, 20% Bostik 4117 Polyester | 85 | 104 |
| 23 | 80% Primacor ® 3460, 20% Hypalon ® 20 | 84 | 102 |
| 24* | 100% Primacor ® 3460 | 91 | 100 |

TABLE III-continued

| Example | Resin, Modifier | % R.B. | Rel % |
|---|---|---|---|
| 25 | 50% Hypalon ® 20S, 50% Primacor ® 3460 | 88 | 97 |
| 26 | 50% Polysar ®EPM 306P, 50% Primacor ®3460 | 73 | 80 |
| 27 | 50% Nipol ® VT 4555, 50% Primacor 3460 | 84 | 92 |

*Control sample

The data in Table III demonstrate that some modifiers in the binder layer at some levels may improve laundering durability, whereas others may have a deleterious effect on performance.

This invention may take on various modifications and alterations without departing from the spirit and scope thereof. Accordingly, it is to be understood that this invention is not to be limited to the above-described, but is to be controlled by the limitations set forth in the following claims and any equivalents thereof.

What is claimed is:

1. An article of clothing sized and configured to fit on a person's body, which comprises:
    (a) a retroreflective applique that includes:
        (i) a binder layer that comprises a thermoplastic copolymer that comprises units which contain carboxyl groups;
        (ii) a layer of optical elements having portions embedded in the binder layer; and
        (iii) a metal reflective layer that is disposed beneath the embedded portions of the optical elements; and
    (b) a substrate which forms part of the outer portion of the article of clothing, the retroreflective applique being secured to the substrate.

2. The article of clothing of claim 1, wherein the thermoplastic copolymer contains: (i) units selected from the group consisting of acrylic acid, methacrylic acid, itaconic acid, citraconic acid, maleic acid, fumaric acid, and combinations thereof; and (ii) units selected from the group consisting of ethylene, propylene, butadiene, isoprene, isobutylene, acrylonitrile, chloroprene, vinyl halides, vinylidene halides, vinyl alkyl acrylate, vinyl alkyl methacrylate, vinyl styrene, methyl styrene, vinyl alcohol, vinyl acetate, acrylamide, alkyl cyanoacrylate, alkyl vinyl ether and combinations thereof, where the alkyl group in the vinyl alkyl acrylate, vinyl alkyl methacrylate, alkyl cyanoacrylate and alkyl vinyl ether contains up to eight carbon atoms.

3. The article of clothing of claim 2, wherein the binder layer contains units of acrylic acid, methacrylic acid, or a combination thereof, and ethylene units.

4. The article of clothing of claim 3, wherein the binder layer comprises poly(ethylene-co-acrylic acid), poly(ethylene-co-methacrylic acid), or a combination thereof.

5. The article of clothing of claim 3, wherein the units that contain acidic functionality comprise 2 to 30 weight percent of the copolymer, and the units of ethylene comprise 70 to 98 weight percent of the copolymer.

6. The article of clothing of claim 5, wherein the units that contain acidic functionality comprise 4 to 20 weight percent of the thermoplastic copolymer, and the ethylene units comprise 80 to 96 weight percent of the thermoplastic copolymer.

7. The article of clothing of claim 5, wherein the retroreflective applique includes a plasticizer selected from the group consisting of di-octylterephthalate, di-isodecylphthalate, alkylbenzylphthalate, or combinations thereof.

8. The article of clothing of claim 5, wherein the optical elements are microspheres that are substantially spherical in shape, that have an average diameter in the range of approximately 30 to 200 microns, and that have a refractive index of 1.7 to 2.0.

9. The article of clothing of claim 8, wherein the metal reflective layer is disposed at least on a portion of the embedded portion of the optical elements.

10. The article of clothing of claim 9, wherein the metal reflective layer comprises elemental aluminum, elemental silver, or a combination thereof.

11. The article of clothing of claim 10, wherein the metal reflective layer comprises elemental aluminum.

12. The article of clothing of claim 1, wherein the binder layer is a continuous, fluid-impermeable layer of a thermoplastic copolymer containing poly(ethylene-co-acrylic acid), polyethylene-co-methacrylic acid), or a combination thereof, and wherein the metal reflective layer contains elemental aluminum.

13. The article of clothing of claim 1, wherein the binder layer has a thickness of 1 to 250 microns and contains a thermoplastic elastomer.

14. The article of clothing of claim 1, selected from the group consisting of a shirt, sweater, jacket, coat, pants, shoe, sock, glove, belt, hat, suit, one-piece body garment, vest, bag, and backpack.

15. An article of clothing sized and configured to fit on a person's body, which comprises:
    (a) a retroreflective applique that includes:
        (i) a thermoplastic binder layer that comprises poly(ethylene-co-acrylic acid), poly(ethylene-co-methacrylic acid) or a combination thereof;
        (ii) a monolayer of microspheres having portions embedded in the binder layer;
        (iii) a metal reflective layer that contains aluminum disposed on the embedded portions of the microspheres; and
    (b) a substrate which forms part of the outer portion of the article of clothing, the retroreflective applique being secured to the substrate.

16. A retroreflective article, which comprises:
    (a) a fabric substrate;
    (b) a binder layer that has first and second major surfaces and comprises a thermoplastic copolymer that includes units which contain carboxyl groups, the first major surface of the binder layer being secured to the first major surface of the fabric substrate;
    (c) a layer of optical elements having portions embedded in the second major surface of the binder layer; and
    (d) a metal reflective layer that is disposed beneath the embedded portions of the optical elements.

17. The retroreflective article of claim 16, wherein the binder layer is a continuous, fluid-impermeable layer of a thermoplastic copolymer containing poly(ethylene-co-acrylic acid), polyethylene-co-methacrylic acid), or a combination thereof, and wherein the metal reflective layer contains elemental aluminum.

* * * * *

UNITED STATES PATENT AND TRADEMARK OFFICE
CERTIFICATE OF CORRECTION

PATENT NO.: 6,110,558
DATED: August 29, 2000
INVENTOR(S): Britton G. Billingsley et al.

It is certified that error appears in the above-identified patent and that said Letters Patent is hereby corrected as shown below:

Column 4, line 30, delete the "S" between "fumaric" and "acid".

Signed and Sealed this

Fifteenth Day of May, 2001

*Attest:*

NICHOLAS P. GODICI

*Attesting Officer*     *Acting Director of the United States Patent and Trademark Office*

UNITED STATES PATENT AND TRADEMARK OFFICE
CERTIFICATE OF CORRECTION

PATENT NO.     : 6,110,558
DATED          : August 29, 2000
INVENTOR(S)    : Britton G. Billingsley et al.

It is certified that error appears in the above-identified patent and that said Letters Patent is hereby corrected as shown below:

Column 4,
Line 30, delete the "S" between "fumaric" and "acid".

Signed and Sealed this

Twenty-first Day of September, 2004

JON W. DUDAS
*Director of the United States Patent and Trademark Office*